US012587892B2

(12) United States Patent
    Lee

(10) Patent No.: US 12,587,892 B2
(45) Date of Patent: Mar. 24, 2026

(54) APPARATUS FOR PERFORMING VEHICLE OTA UPDATE AND METHOD THEREOF

(71) Applicants: Hyundai Motor Company, Seoul (KR); Kia Corporation, Seoul (KR)

(72) Inventor: Young Kwan Lee, Gwacheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 522 days.

(21) Appl. No.: 17/862,536

(22) Filed: Jul. 12, 2022

(65) Prior Publication Data

US 2023/0035502 A1 Feb. 2, 2023

(30) Foreign Application Priority Data

Jul. 30, 2021 (KR) ........................ 10-2021-0100976

(51) Int. Cl.
    *H04W 24/08* (2009.01)
    *G06F 8/65* (2018.01)
    *H04W 28/02* (2009.01)
    *H04L 47/25* (2022.01)

(52) U.S. Cl.
    CPC ....... *H04W 28/0252* (2013.01); *H04W 24/08* (2013.01); *G06F 8/65* (2013.01)

(58) Field of Classification Search
    CPC ..... H04W 28/0252; H04W 24/08; G06F 8/65; H04L 47/25
    See application file for complete search history.

(56) References Cited

U.S. PATENT DOCUMENTS

| | | | |
|---|---|---|---|
| 8,385,199 B1 * | 2/2013 | Coward ................. | H04L 47/22 |
| | | | 370/230.1 |
| 2005/0053081 A1 * | 3/2005 | Andersson ............ | H04W 28/18 |
| | | | 370/401 |
| 2007/0217359 A1 * | 9/2007 | Kobayashi ............ | H04W 28/26 |
| | | | 370/335 |
| 2020/0218531 A1 * | 7/2020 | Kushwaha ............... | G06F 8/66 |

* cited by examiner

*Primary Examiner* — Moo Jeong
*Assistant Examiner* — Theresa Nguyen
(74) *Attorney, Agent, or Firm* — Fox Rothschild LLP

(57) ABSTRACT

An apparatus for performing a vehicle OTA update is provided. The apparatus includes a load factor measurement device that measures a load factor of a first communication channel for transmitting data for an OTA update of a controller included in a vehicle; a communication speed adjustment device that generates information for adjusting a transmission speed of the data over the first communication channel, based on the measured load factor; and a communication channel change device that generates information about whether to change a communication channel for the OTA update of the controller, based on the generated information for adjusting the transmission speed.

18 Claims, 4 Drawing Sheets

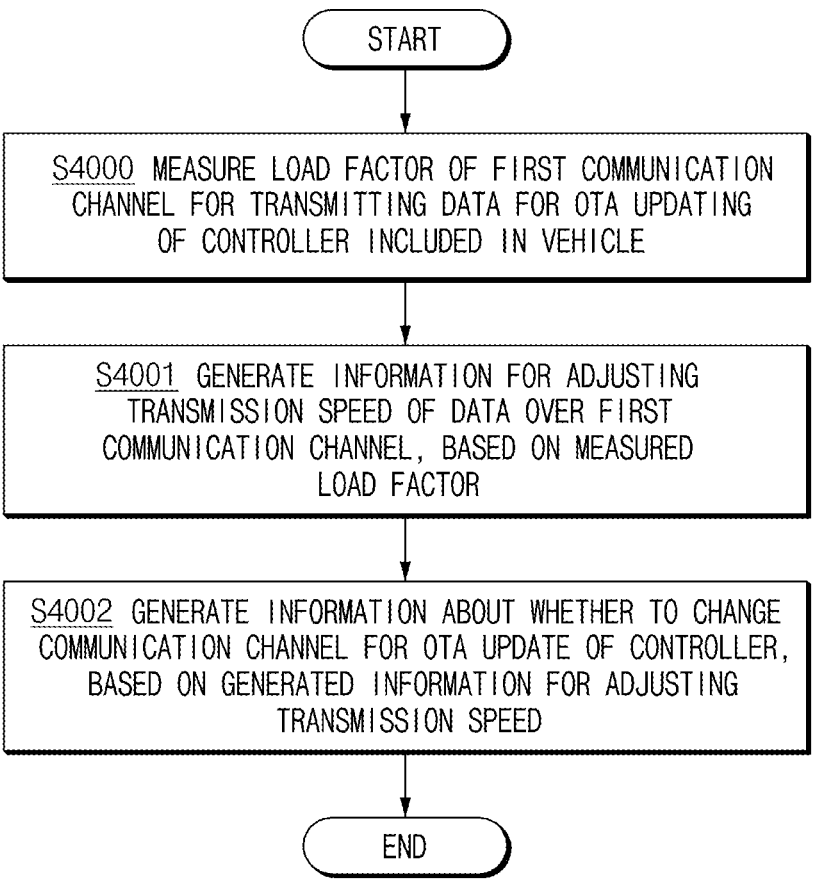

START

S4000 MEASURE LOAD FACTOR OF FIRST COMMUNICATION CHANNEL FOR TRANSMITTING DATA FOR OTA UPDATING OF CONTROLLER INCLUDED IN VEHICLE

S4001 GENERATE INFORMATION FOR ADJUSTING TRANSMISSION SPEED OF DATA OVER FIRST COMMUNICATION CHANNEL, BASED ON MEASURED LOAD FACTOR

S4002 GENERATE INFORMATION ABOUT WHETHER TO CHANGE COMMUNICATION CHANNEL FOR OTA UPDATE OF CONTROLLER, BASED ON GENERATED INFORMATION FOR ADJUSTING TRANSMISSION SPEED

END

FIG.4

APPARATUS FOR PERFORMING VEHICLE OTA UPDATE AND METHOD THEREOF

CROSS-REFERENCE TO RELATED APPLICATION

This application is based on and claims the benefit of Korean Patent Application No. 10-2021-0100976, filed in the Korean Intellectual Property Office on Jul. 30, 2021, the entire contents of which are incorporated herein by reference.

TECHNICAL FIELD

Embodiments of the present disclosure relate to an apparatus for performing a vehicle over-the-air (OTA) update and a method thereof.

DESCRIPTION OF THE RELATED ART

In general, a vehicle may perform a software update of a controller (e.g., a central communication unit (CCU)) included in the vehicle. The software update of the controller may be performed based on an OTA update. Furthermore, data for the OTA update of the above-mentioned controller may be transmitted over one or more communication channels. In other words, the controller may receive data for an OTA update from a plurality of communication channels. Herein, in this case, when a burden occurs in data transmission/reception of a specific communication channel, the OTA update of the controller may be delayed.

Furthermore, when the specific communication channel for transmitting/receiving the data for the OTA update of the controller shows a continuously slow data transmission/reception speed and when setting the communication channel to a default communication channel, the OTA update of the controller may be delayed.

SUMMARY

An embodiment of the present disclosure provides an apparatus and a method for adjusting a transmission/reception speed of data over communication channels to perform a faster update, in performing an OTA update of a vehicle controller.

Another embodiment of the present disclosure provides an apparatus and a method for deleting a communication channel showing a continuously slow transmission speed from a default channel to perform a more secure and efficient update, in performing an OTA update of a vehicle controller.

The technical problems to be solved by the present disclosure are not limited to the aforementioned problems, and any other technical problems not mentioned herein will be clearly understood from the following description by those skilled in the art to which the present disclosure pertains.

According to an embodiment of the present disclosure, an apparatus for performing a vehicle over-the-air (OTA) update may include a load factor measurement device that measures a load factor of a first communication channel for transmitting data for an OTA update of a controller included in a vehicle, a communication speed adjustment device that generates information for adjusting a transmission speed of the data over the first communication channel, based on the measured load factor, a communication channel change device that generates information about whether to change a communication channel for the OTA update of the controller, based on the generated information for adjusting the transmission speed.

Furthermore, according to embodiments, the apparatus may further include an update device that performs the OTA update of the controller based on the transmitted data.

Furthermore, according to embodiments, the information for adjusting the transmission speed may include one of information for increasing the transmission speed of the data or information for decreasing the transmission speed of the data.

Furthermore, according to embodiments, the information for adjusting the transmission speed may include the information for increasing the transmission speed of the data, in response to that the measured load factor is less than or equal to a predetermined first value and may include the information for decreasing the transmission speed of the data, in response to that the measured load factor is greater than the predetermined first value.

Furthermore, according to embodiments, the data for the OTA update of the controller may be transmitted over one of the first communication channel or a second communication channel.

Furthermore, according to embodiments, the information about whether to change the communication channel may include one of information for maintaining the first communication channel or information for changing to the second communication channel.

Furthermore, according to embodiments, the data for the OTA update of the controller may be transmitted over the first communication channel, in response to that the information about whether to change the communication channel includes the information for maintaining the first communication channel, and may be transmitted over the second communication channel, in response to that the information about whether to change the communication channel includes the information for changing to the second communication channel.

Furthermore, according to embodiments, the information about whether to change the communication channel may include the information for maintaining the first communication channel, in response to that the information for adjusting the transmission speed includes the information for increasing the transmission speed, and may include the information for changing to the second communication channel, in response to that the information for adjusting the transmission speed includes the information for decreasing the transmission speed.

Furthermore, according to embodiments, the information about whether to change the communication channel may include the information for maintaining the first communication channel, in response to that the number of pieces of the information for decreasing the transmission speed, which is included in the information for adjusting the transmission speed, is less than or equal to a predetermined second value, and may include the information for changing to the second communication channel, in response to that the number of pieces of the information for decreasing the transmission speed, which is included in the information for adjusting the transmission speed, is greater than the predetermined second value.

Furthermore, according to embodiments, the controller may include a central communication unit (CCU) of the vehicle.

According to another embodiment of the present disclosure, a method for performing a vehicle over-the-air (OTA) update may include measuring a load factor of a first communication channel for transmitting data for an OTA update of a controller included in a vehicle, generating information for adjusting a transmission speed of the data over the first communication channel, based on the measured load factor, and generating information about whether to change a communication channel for the OTA update of the controller, based on the generated information for adjusting the transmission speed.

Furthermore, according to embodiments, the method may further include performing the OTA update of the controller based on the transmitted data.

Furthermore, according to embodiments, the information for adjusting the transmission speed may include one of information for increasing the transmission speed of the data or information for decreasing the transmission speed of the data.

Furthermore, according to embodiments, the information for adjusting the transmission speed may include the information for increasing the transmission speed of the data, in response to that the measured load factor is less than or equal to a predetermined first value and may include the information for decreasing the transmission speed of the data, in response to that the measured load factor is greater than the predetermined first value.

Furthermore, according to embodiments, the data for the OTA update of the controller may be transmitted over one of the first communication channel or a second communication channel.

Furthermore, according to embodiments, the information about whether to change the communication channel may include one of information for maintaining the first communication channel or information for changing to the second communication channel.

Furthermore, according to embodiments, the data for the OTA update of the controller may be transmitted over the first communication channel, in response to that the information about whether to change the communication channel includes the information for maintaining the first communication channel, and may be transmitted over the second communication channel, in response to that the information about whether to change the communication channel includes the information for changing to the second communication channel.

Furthermore, according to embodiments, the information about whether to change the communication channel may include the information for maintaining the first communication channel, in response to that the information for adjusting the transmission speed includes the information for increasing the transmission speed, and may include the information for changing to the second communication channel, in response to that the information for adjusting the transmission speed includes the information for decreasing the transmission speed.

Furthermore, according to embodiments, the information about whether to change the communication channel may include the information for maintaining the first communication channel, in response to that the number of pieces of the information for decreasing the transmission speed, which is included in the information for adjusting the transmission speed, is less than or equal to a predetermined second value, and may include the information for changing to the second communication channel, in response to that the number of pieces of the information for decreasing the transmission speed, which is included in the information for adjusting the transmission speed, is greater than the predetermined second value.

Furthermore, according to embodiments, the controller may include a CCU of the vehicle.

As discussed, the method and system suitably include use of a controller or processor.

In another embodiment, vehicles are provided that comprise an apparatus as disclosed herein.

BRIEF DESCRIPTION OF THE DRAWINGS

The above and other objects, features and advantages of the present disclosure will be more apparent from the following detailed description taken in conjunction with the accompanying drawings:

FIG. 4 is a flowchart illustrating an example of a method for performing a vehicle OTA update according to embodiments.

DETAILED DESCRIPTION

Figure 1:
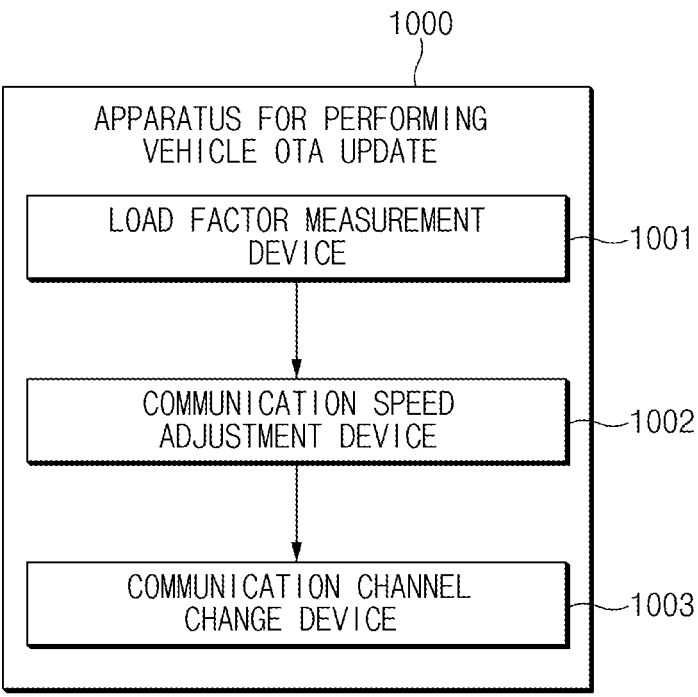
FIG. 1 illustrates an example of an apparatus for performing a vehicle OTA update according to embodiments.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art and are not to be interpreted as having ideal or excessively formal meanings unless clearly defined as having such in the present application.

Hereinafter, embodiments of the present disclosure will be described in detail with reference to FIGS. 1 to 4.

FIG. 1 illustrates an example of an apparatus for performing a vehicle OTA update according to embodiments.

The drawing is a block diagram illustrating an example of an apparatus 1000 for performing a vehicle OTA update (or an apparatus 1000) according to embodiments.

The OTA update according to embodiments may indicate a scheme of updating software of a vehicle using a wireless communication network. In general, software of the vehicle may wiredly connect a storage device storing data for a software update to the vehicle to execute an update. Herein, due to the development of communication technology, it is possible for the vehicle to directly receive and update data necessary for a software update using the wireless communication network.

In general, the vehicle may perform a software update of a controller (e.g., a central communication unit (CCU)) included in the vehicle. The software update of the controller may be performed based on an OTA update. Furthermore, data for the OTA update of the above-mentioned controller may be transmitted over one or more communication channels. In other words, the controller may receive data for an OTA update from a plurality of communication channels. Herein, in this case, when a burden occurs in data transmission/reception of a specific communication channel, the OTA update of the controller may be delayed.

Furthermore, when the specific communication channel for transmitting/receiving the data for the OTA update of the controller shows a continuously slow data transmission/reception speed and when setting the communication channel to a default communication channel, the OTA update of the controller may be delayed.

In performing an OTA update of a vehicle controller, the apparatus 1000 according to embodiments may adjust a transmission/reception speed of data over communication channels to perform faster update. Furthermore, in performing the OTA update of the vehicle controller, the apparatus 1000 according to embodiments may delete a communication channel showing a continuously slow transmission speed from a default channel to perform a more secure and efficient update.

The apparatus 1000 for performing the vehicle OTA update according to embodiments may include a load factor measurement device 1001, a communication speed adjustment device 1002, and/or a communication channel change device 1003. The apparatus 1000 according to embodiments may further include one or more elements which is or are not shown in the drawing. The apparatus 1000 according to embodiments may be located inside or outside the vehicle.

The load factor measurement device 1001 according to embodiments may measure a load factor of a first communication channel for transmitting data for the OTA update of the controller included in the vehicle. The first communication channel according to embodiments may be one of the plurality of communication channels. The load factor according to embodiments may be a value based on a burden of the above-mentioned communication channel. For example, it may be taken a longer time to transmit the same amount of data when a load factor of a specific communication channel is high than when the load factor is low.

In other words, the load factor measurement device 1001 according to embodiments may measure a load factor of a communication channel (or a first communication channel) which currently transmits the data for the OTA update of the controller.

The communication speed adjustment device 1002 according to embodiments may generate information for adjusting a transmission speed of data over the first communication channel based on the measured load factor. The information for adjusting the transmission speed according to embodiments may include one of information for increasing the transmission speed of the data or information for decreasing the transmission speed of the data. The data transmission speed for the OTA update of the controller may more increase than the current transmission speed based on the above-mentioned information for increasing the transmission speed. The data transmission speed for the OTA update of the controller may more decrease than the current transmission speed based on the above-mentioned information for decreasing the transmission speed.

In other words, the data transmission speed for the OTA update of the controller may more increase or decrease than the current transmission speed based on the information for adjusting the transmission speed, which is generated by the above-mentioned communication speed adjustment device 1002.

The communication channel change device 1003 according to embodiments may generate information about whether to change a communication channel for the OTA update of the controller, based on the generated information for adjusting the transmission speed.

As described above, the data for the OTA update of the controller may be transmitted over one or more communication channels (e.g., a first communication channel and a second communication channel). Herein, when the communication speed of the communication channel which currently transmits/receives data is slow (e.g., when the load factor of the communication channel is greater than a predetermined first value), the apparatus 1000 may generate information for changing the communication channel for transmitting/receiving the data.

The information about whether to change the communication channel according to embodiments may include the information for changing the above-mentioned communication channel. In other words, the information about whether to change the communication channel may include one of information for maintaining the first communication channel or information for changing to the second communication channel.

The data for the OTA update of the controller may be transmitted over the first communication channel, in response to that the information about whether to change the communication channel includes the information for maintaining the first communication channel. The data for the OTA update of the controller according to embodiments may be transmitted over the second communication channel, in response to that the information about whether to change the communication channel includes the information for changing to the second communication channel.

The apparatus 1000 according to embodiments may further include an update device (not shown in the drawing) for performing an OTA update of the controller.

By means of the method described in the drawing, the apparatus 1000 according to embodiments may identify a burden of a communication channel which transmits/receives data for an OTA update of the controller and may adjust a data transmission/reception speed of a current communication channel depending on a burden of a communication channel which currently transmits/receives data. Furthermore, the apparatus 1000 may continuously adjust a data transmission/reception speed of a communication channel and may change the communication channel which transmits/receives data if necessary to faster and more efficiently perform an OTA update of the controller.

Figure 2:
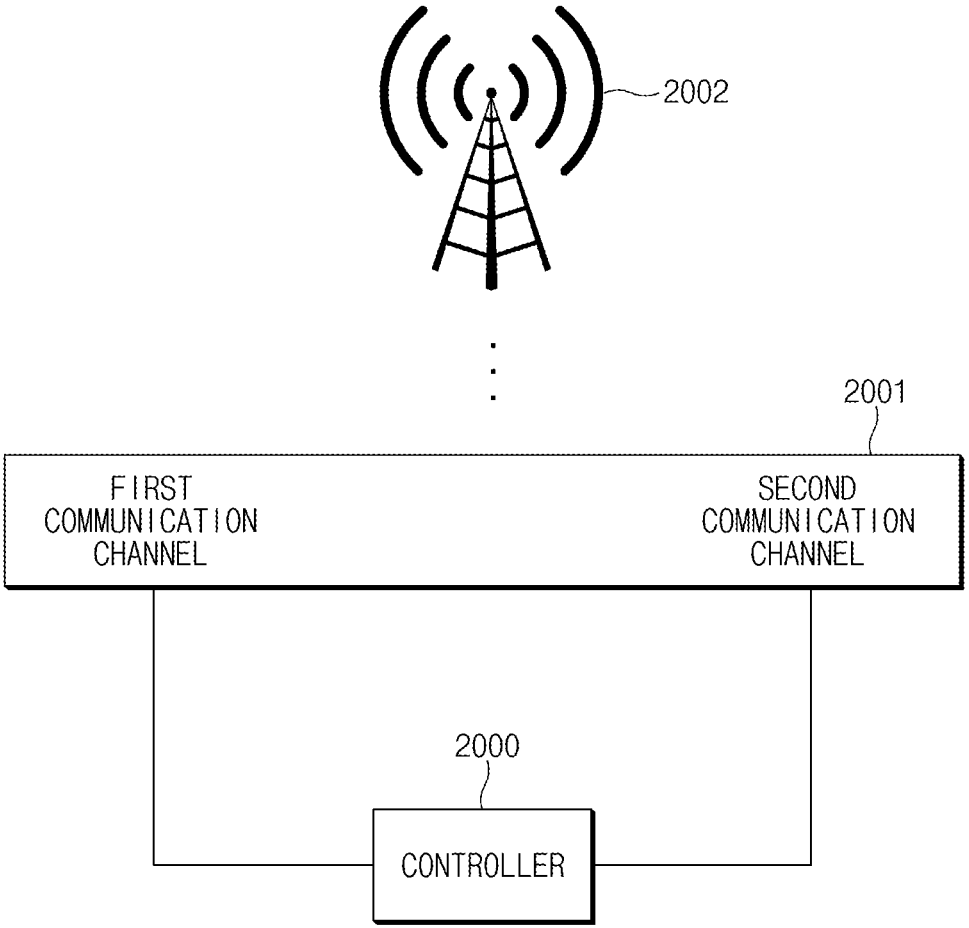
FIG. 2 is a drawing illustrating an example of a method for performing an OTA update of a controller according to embodiments.

FIG. 2 is a drawing illustrating an example of a method for performing an OTA update of a controller according to embodiments.

The drawing is a drawing illustrating an example of a method for performing an OTA update of a controller (e.g., a controller described above with reference to FIG. 1) according to embodiments.

As described above with reference to FIG. 1, the controller may receive data for an OTA update over a plurality of communication channels. 2000 denotes the controller according to embodiments. 2001 denotes a first communication channel and a second communication channel according to embodiments 2002 denotes an OTA server which transmits data for the above-mentioned OTA update.

As described above with reference to FIG. 1, the data for the OTA update of the controller may be transmitted over one of the first communication channel or the second communication channel. Furthermore, the data for the OTA update of the controller may be transmitted over both the first communication channel and the second communication channel.

According to embodiments, a communication channel which currently transmits data to the controller may be referred to as the first communication channel. In other words, an apparatus 1000 of FIG. 1 may measure a load factor of the first communication channel and may continuously transmit data over the first communication channel if necessary or may change a communication channel for an OTA update of the controller to the second communication channel and may transmit data over the second communication channel.

By means of the method described in the drawing, the apparatus 1000 according to embodiments may identify a burden of a communication channel which transmits/receives data for an OTA update of the controller and may adjust a data transmission/reception speed of a current communication channel depending on a burden of a communication channel which currently transmits/receives data. Furthermore, the apparatus 1000 may continuously adjust a data transmission/reception speed of a communication channel and may change the communication channel which transmits/receives data if necessary to faster and more efficiently perform an OTA update of the controller.

Figure 3:
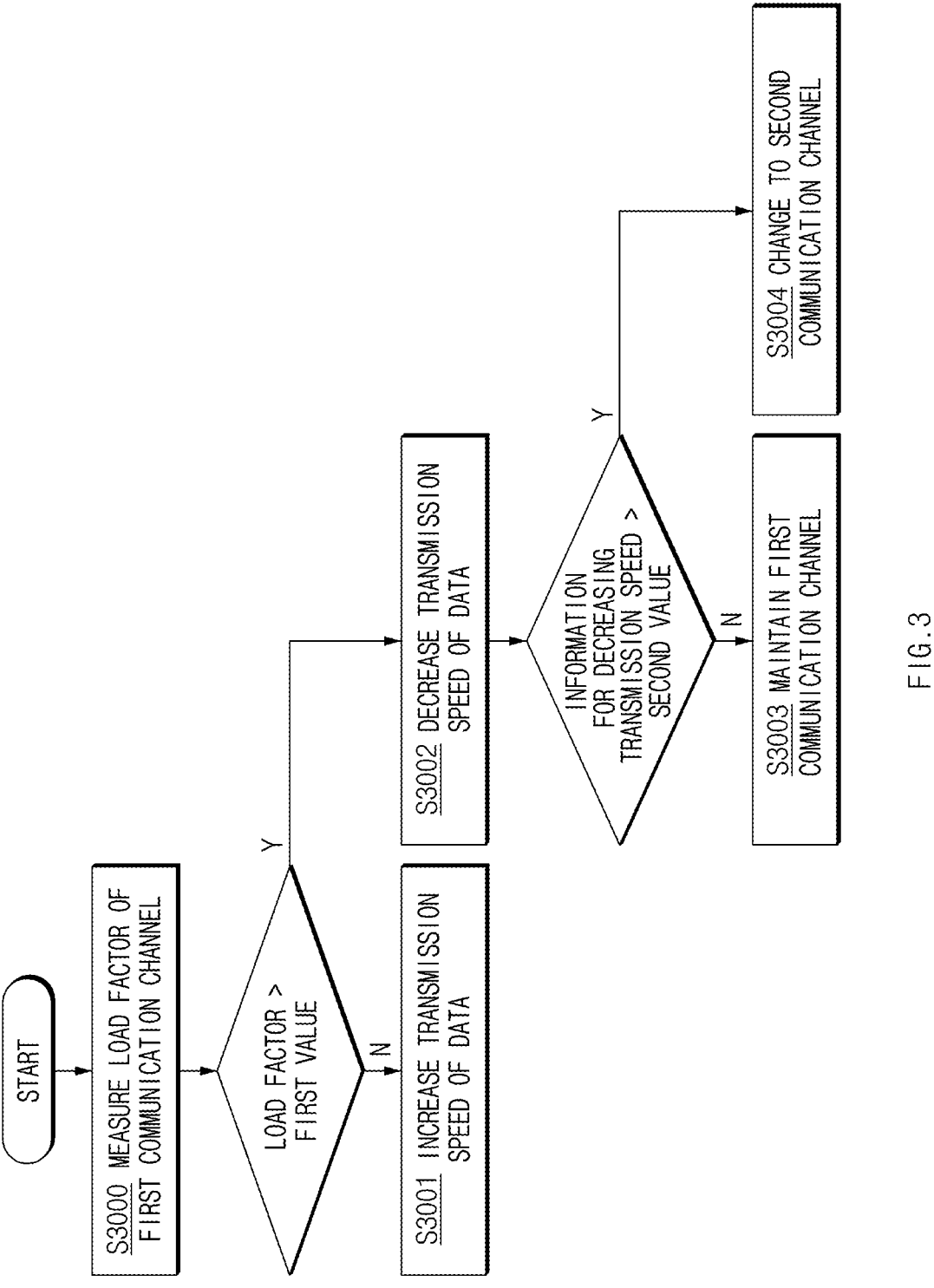
FIG. 3 is a drawing illustrating an example of a method for adjusting a transmission speed of data for an OTA update of a controller according to embodiments.

FIG. 3 is a drawing illustrating an example of a method for adjusting a transmission speed of data for an OTA update in a controller according to embodiments.

The drawing is a flowchart illustrating an example of a method for adjusting a transmission speed of data for an OTA update of a controller (e.g., a controller described with reference to FIGS. 1 and 2).

As described above with reference to FIGS. 1 and 2, an apparatus 1000 according to embodiments may maintain or change a communication channel over which data is transmitted/received, based on a load factor of a communication channel which transmits data for an OTA update of a controller.

The apparatus 1000 according to embodiments may perform the method described in the drawing.

In S3000, the apparatus 1000 (e.g., a load factor measurement device 1001 of FIG. 1) according to embodiments may measure a load factor of a first communication channel which currently transmits data for an OTA update of the controller.

The apparatus 1000 (e.g., a communication speed adjustment device 1002 of FIG. 1) according to embodiments may generate information for adjusting a transmission speed of data over the first communication channel based on the measured load factor.

The information for adjusting the transmission speed according to embodiments may include information for increasing a transmission speed of data, in response to that the measured load factor is less than or equal to a predetermined first value and may include information for decreasing the transmission speed of the data, in response to that the measured load factor is greater than the predetermined first value.

In S3001, the apparatus 1000 (e.g., the communication speed adjustment device 1002) according to embodiments may increase the transmission speed of the data over the first communication channel based on the above-mentioned information for increasing the transmission speed. Furthermore, in S3002, the apparatus 1000 (e.g., the communication speed adjustment device 1002) according to embodiments may decrease the transmission speed of the data over the first communication channel based on the above-mentioned information for decreasing the transmission speed.

As described above with reference to FIGS. 1 and 2, a communication channel change device 1003 according to embodiments may generate information about whether to change a communication channel for an OTA update of the controller, based on the generated information for adjusting the transmission speed.

The information about whether to change the communication channel according to embodiments may be generated based on information including the above-mentioned information for adjusting the transmission speed.

For example, the information about whether to change the communication channel may include information for maintaining the first communication channel, in response to that the information for adjusting the transmission speed includes the information for increasing the transmission speed, and may include information for changing to the second communication channel, in response to that the information for adjusting the transmission speed includes the information for decreasing the transmission speed.

Furthermore, for example, the information about whether to change the communication channel may include information for maintaining the first communication channel, in response to that the number of pieces of the information for decreasing the transmission speed, which is included in the information for adjusting the transmission speed, is less than or equal to a predetermined second value, and may include information for changing to the second communication channel, in response to that the number of pieces of the information for decreasing the transmission, which is included in the information for adjusting the transmission speed, is greater than the predetermined second value.

As described in the above-mentioned example, the drawing illustrates an example where information included in the information about whether to change the communication channel, is changed based on whether the number of pieces of the information for decreasing the transmission speed, which is included in the information for adjusting the transmission speed, is greater than or less than the predetermined second value.

For example, when the number of pieces of the information for decreasing the transmission speed, which is included in the information for adjusting the transmission speed, is greater than or equal to 10 (e.g., when the communication speed adjustment device 1002 generates 11 pieces of information for decreasing the transmission speed), the information about whether to change the communication channel may include information for changing to the second communication channel.

In S3003, the apparatus 1000 (e.g., the communication channel change device 1003) according to embodiments may maintain a communication channel, which receives data for an OTA update of the controller, as the first communication channel, based on the above-mentioned information for maintaining the first communication channel. In S3004, the apparatus 1000 (e.g., the communication channel change device 1003) according to embodiments may change the communication channel, which receives the data for the OTA update of the controller, to the second communication channel, based on the above-mentioned information for changing to the second communication channel.

By means of the method described in the drawing, the apparatus 1000 according to embodiments may identify a burden of a communication channel which transmits/receives data for an OTA update of the controller and may adjust a data transmission/reception speed of a current communication channel depending on a burden of a communication channel which currently transmits/receives data. Furthermore, the apparatus 1000 may continuously adjust a data transmission/reception speed of a communication channel and may change the communication channel which transmits/receives data if necessary to faster and more efficiently perform an OTA update of the controller.

FIG. 4 is a flowchart illustrating an example of a method for performing a vehicle OTA update according to embodiments.

The drawing is a flowchart illustrating an example of the method for performing the vehicle OTA update (or the method) according to embodiments.

An apparatus 1000 described above with reference to FIGS. 1 to 3 may perform the method described in the drawing.

The method according to embodiments may include measuring (S4000) a load factor of a first communication channel for transmitting data for an OTA update of a controller included in a vehicle, generating (S4001) information for adjusting a transmission speed of data over the first communication channel, based on the measured load factor, and/or generating (S4002) information about whether to change a communication channel for the OTA update of the controller, based on the generated information for adjusting the transmission speed. The method according to embodiments may further include one or more steps which is or are not shown in the drawing.

The method according to embodiments may further include performing the OTA update of the controller based on the transmitted data (not shown in the drawing).

The information for adjusting the transmission speed according to embodiments may include one of information for increasing the transmission speed of the data or information for decreasing the transmission speed of the data.

The information for adjusting the transmission speed according to embodiments may include information for increasing a transmission speed of data, in response to that the measured load factor is less than or equal to a predetermined first value and may include information for decreasing the transmission speed of the data, in response to that the measured load factor is greater than the predetermined first value. According to embodiments, a description of the information for adjusting the transmission speed may be the same or similar to that described above with reference to FIGS. 1 to 3.

The data for the OTA update of the controller may be transmitted over one of the first communication channel or the second communication channel. A description of the first communication channel and the second communication channel according to embodiments may be the same or similar to that described above with reference to FIGS. 1 to 3.

The information about whether to change the communication channel may include one of information for maintaining the first communication channel or information for changing to the second communication channel. According to embodiments, a description of the information about whether to change the communication channel may be the same or similar to that described above with reference to FIGS. 1 to 3.

The data for the OTA update of the controller according to embodiments may be transmitted over the first communication channel, in response to that the information about whether to change the communication channel includes the information for maintaining the first communication channel, and may be transmitted over the second communication channel, in response to that the information about whether to change the communication channel includes the information for changing to the second communication channel. According to embodiments, a description of the information about whether to change the communication channel may be the same or similar to that described above with reference to FIGS. 1 to 3.

The information about whether to change the communication channel according to embodiments may include information for maintaining the first communication channel, in response to that the information for adjusting the transmission speed includes the information for increasing the transmission speed, and may include information for changing to the second communication channel, in response to that the information for adjusting the transmission speed includes the information for decreasing the transmission speed.

The information about whether to change the communication channel may include information for maintaining the first communication channel, in response to that the number of pieces of the information for decreasing the transmission speed, which is included in the information for adjusting the transmission speed, is less than or equal to a predetermined second value, and may include information for changing to the second communication channel, in response to that the number of pieces of the information for decreasing the transmission, which is included in the information for adjusting the transmission speed, is greater than the predetermined second value.

The controller according to embodiments may include a CCU of the vehicle.

By means of the method described in the drawing, the apparatus 1000 according to embodiments may identify a burden of a communication channel which transmits/receives data for an OTA update of the controller and may adjust a data transmission/reception speed of a current communication channel depending on a burden of a communication channel which currently transmits/receives data. Furthermore, the apparatus 1000 may continuously adjust a data transmission/reception speed of a communication channel and may change the communication channel which transmits/receives data if necessary to faster and more efficiently perform an OTA update of the controller.

In preforming an OTA update of a vehicle controller, embodiments may adjust a transmission/reception speed of data over communication channels to perform a faster update.

Furthermore, in performing the OTA update of the vehicle controller, embodiments may delete a communication channel showing a continuously slow transmission speed from a default channel to perform a more secure and efficient update.

In addition, various effects ascertained directly or indirectly through embodiments of the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for performing a vehicle over-the-air (OTA) update, the apparatus comprising:

a load factor measurement device including a processor and configured to measure a load factor of a first communication channel for transmitting data for an OTA update of a controller included in a vehicle;

a communication speed adjustment device including a processor and configured to generate information for adjusting a transmission speed of the data over the first communication channel, based on the measured load factor; and a communication channel change device including a processor and configured to generate information about whether to change a communication channel for the OTA update of the controller, based on the generated information for adjusting the transmission speed;

wherein the information about whether to change the communication channel includes information for maintaining the first communication channel and adjusting the transmission speed and information for changing to a second communication channel based on a result of comparing the information for adjusting the transmission speed of the first communication channel with a preset threshold value;

wherein the information about whether to change the communication channel includes information determined based on a comparison between the number of packets of the information for adjusting the transmission speed and a predetermined reference value.

2. The apparatus of claim 1, further comprising:

an update device including a processor and configured to perform the OTA update of the controller based on the transmitted data.

3. The apparatus of claim 1, wherein the information for adjusting the transmission speed comprises one of information for increasing the transmission speed of the data or information for decreasing the transmission speed of the data.

4. The apparatus of claim 3, wherein the information for adjusting the transmission speed comprises:

the information for increasing the transmission speed of the data, in response to that the measured load factor is less than or equal to a predetermined first value, and the information for decreasing the transmission speed of the data, in response to that the measured load factor is greater than the predetermined first value.

5. The apparatus of claim 3, wherein the data for the OTA update of the controller is transmitted over one of the first communication channel or the second communication channel.

6. The apparatus of claim 1, wherein the data for the OTA update of the controller:

is transmitted over the first communication channel, in response to that the information about whether to change the communication channel includes the information for maintaining the first communication channel, and is transmitted over the second communication channel, in response to that the information about whether to change the communication channel includes the information for changing to the second communication channel.

7. The apparatus of claim 1, wherein the information about whether to change the communication channel comprises:

the information for maintaining the first communication channel, in response to that the information for adjusting the transmission speed includes the information for increasing the transmission speed, and the information for changing to the second communication channel, in response to that the information for adjusting the transmission speed includes the information for decreasing the transmission speed.

8. The apparatus of claim 1, wherein the information about whether to change the communication channel comprises:

the information for maintaining the first communication channel, in response to that the number of packets of the information for decreasing the transmission speed, which is included in the information for adjusting the transmission speed, is less than or equal to a predetermined second value, and the information for changing to the second communication channel, in response to that the number of packets of the information for decreasing the transmission speed, which is included in the information for adjusting the transmission speed, is greater than the predetermined second value.

9. The apparatus of claim 1, wherein the controller comprises a central communication unit (CCU) of the vehicle.

10. A method for performing a vehicle OTA update, the method comprising:

measuring a load factor of a first communication channel for transmitting data for an OTA update of a controller included in a vehicle;

generating information for adjusting a transmission speed of the data over the first communication channel, based on the measured load factor; and generating information about whether to change a communication channel for the OTA update of the controller, based on the generated information for adjusting the transmission speed;

wherein the information about whether to change the communication channel includes information for maintaining the first communication channel and adjusting the transmission speed, and information for changing to a second communication channel based on a result of comparing the information for adjusting the transmission speed of the first communication channel with a preset threshold value;

wherein the information about whether to change the communication channel includes information determined based on a comparison between the number of packets of the information for adjusting the transmission speed and a predetermined reference value.

11. The method of claim 10, further comprising: performing the OTA update of the controller based on the transmitted data.

12. The method of claim 10, wherein the information for adjusting the transmission speed comprises one of information for increasing the transmission speed of the data or information for decreasing the transmission speed of the data.

13. The method of claim 12, wherein the information for adjusting the transmission speed comprises:

the information for increasing the transmission speed of the data, in response to that the measured load factor is less than or equal to a predetermined first value, and the information for decreasing the transmission speed of the data, in response to that the measured load factor is greater than the predetermined first value.

14. The method of claim 12, wherein the data for the OTA update of the controller is transmitted over one of the first communication channel or a second communication channel.

15. The method of claim 10, wherein the data for the OTA update of the controller:

is transmitted over the first communication channel, in response to that the information about whether to change the communication channel includes the information for maintaining the first communication channel, and is transmitted over the second communication channel, in response to that the information about whether to change the communication channel includes the information for changing to the second communication channel.

16. The method of claim 10, wherein the information about whether to change the communication channel comprises:

the information for maintaining the first communication channel, in response to that the information for adjusting the transmission speed includes the information for increasing the transmission speed, and the information for changing to the second communication channel, in response to that the information for adjusting the transmission speed includes the information for decreasing the transmission speed.

17. The method of claim 10, wherein the information about whether to change the communication channel comprises:

the information for maintaining the first communication channel, in response to that the number of packets of the information for decreasing the transmission speed, which is included in the information for adjusting the transmission speed, is less than or equal to a predetermined second value, and the information for changing to the second communication channel, in response to that the number of packets of the information for decreasing the transmission speed, which is included in the information for adjusting the transmission speed, is greater than the predetermined second value.

18. The method of claim 10, wherein the controller comprises a central communication unit (CCU) of the vehicle.

* * * * *